(12) United States Patent
Takahashi et al.

(10) Patent No.: US 7,832,529 B2
(45) Date of Patent: Nov. 16, 2010

(54) FRICTION MEMBER FOR FRICTIONAL ENGAGEMENT DEVICE AND METHOD FOR PRODUCING THE SAME

(75) Inventors: Atsushi Takahashi, Saitama (JP); Satoshi Yoshida, Saitama (JP); Kentaro Komori, Saitama (JP); Yorinori Kumagai, Saitama (JP); Takao Nakagawa, Saitama (JP); Mihoko Yamashita, Saitama (JP)

(73) Assignees: Honda Motor Co., Ltd., Tokyo (JP); Across Co., Ltd., Saitama (JP)

( * ) Notice: Subject to any disclaimer, the term of this patent is extended or adjusted under 35 U.S.C. 154(b) by 1027 days.

(21) Appl. No.: 11/547,101

(22) PCT Filed: Mar. 29, 2005

(86) PCT No.: PCT/JP2005/005808

§ 371 (c)(1),
(2), (4) Date: Oct. 2, 2006

(87) PCT Pub. No.: WO2005/095812

PCT Pub. Date: Oct. 13, 2005

(65) Prior Publication Data

US 2007/0205076 A1    Sep. 6, 2007

(30) Foreign Application Priority Data

Apr. 2, 2004    (JP) .............................. 2004-110488

(51) Int. Cl.
*F16D 69/00*    (2006.01)

(52) U.S. Cl. .............................. 188/251 A; 192/107 M (58) Field of Classification Search ............. 188/251 A, 188/251 M, 251 R; 192/107 M, 70.14; 428/317.9; 523/152–158
See application file for complete search history.

(56) References Cited

U.S. PATENT DOCUMENTS

| 4,457,967 | A | * | 7/1984 | Chareire et al. ............. 428/212 |
| 5,242,746 | A |   | 9/1993 | Bommier et al. |
| 5,643,663 | A | * | 7/1997 | Bommier et al. ......... 428/317.9 |
| 5,975,270 | A | * | 11/1999 | Tokune et al. ........... 192/107 M |
| 2005/0158509 | A1 |   | 7/2005 | Takahashi et al. |
| 2006/0248700 | A1 | * | 11/2006 | Takahashi et al. ............. 29/412 |

FOREIGN PATENT DOCUMENTS

| JP | 5-39478 A | 2/1993 |
| JP | 5-345671 A | 12/1993 |
| JP | 6-241253 A | 8/1994 |
| JP | 06-345533 A | 12/1994 |
| JP | 9-170629 A | 6/1997 |
| JP | 11-005850 A | 1/1999 |
| JP | 2003-240033 A | 8/2003 |
| JP | 2003-313082 A | 11/2003 |

* cited by examiner

*Primary Examiner*—Pam Rodriguez
(74) *Attorney, Agent, or Firm*—Arent Fox LLP (57) ABSTRACT

A friction member for a frictional engagement device is provided in which weight is reduced, impact resistance is enhanced and sliding resistance is improved; and also provided is a method for producing the same. As a friction member (10) for a frictional engagement device, a friction member made of a carbon fiber/carbonaceous composite material is provided which is obtained by implementing a heat treatment on a precursor, the precursor comprising a matrix composed of a carbon binder and an additive and carbon fiber dispersed in the matrix, wherein a porosity of the friction member is 20-60%.

6 Claims, 8 Drawing Sheets

FRICTION MEMBER FOR FRICTIONAL ENGAGEMENT DEVICE AND METHOD FOR PRODUCING THE SAME

CROSS-REFERENCE TO RELATED APPLICATION

This application is a National Stage entry of International Application No. PCT/JP2005/005808, filed Mar. 29, 2005, the entire specification claims and drawings of which are incorporated herewith by reference.

FIELD OF THE INVENTION

The present invention relates to a friction member for a frictional engagement device and a method for producing the same, and particularly to a friction member which is suitable for a frictional engagement device, such as a clutch for an automatic transmission of an automobile, and a method for producing the same.

BACKGROUND ART

Conventionally, a frictional engagement device, such as a clutch for an automatic transmission of an automobile, is provided with a friction member formed of a cored bar made of ferric metal in a shape of a plate, and a friction material, such as cellulose fiber, adhered to the cored bar. The friction material is generally called a paper friction material, which is obtained by impregnating an organic fiber material in a form of paper with a solution prepared by dissolving a resin for a friction material into an organic solvent, drying and heat hardening the resultant substance. A friction material formed of carbon fiber has been also known where carbon fiber is used for a purpose of reducing size and weight (see, for example, JP 11-5850A, paragraphs 0019-0020).

The friction members with the friction material adhered thereto are laminated alternately with separator plates as coupling members, to thereby form a multiple disc clutch, which is disposed as a driving force transmission member in a frictional engagement device. In the frictional engagement device, driving force to wheels is transmitted from an engine by bringing the friction member into contact with the separator plate by pressure, and driving force to the wheel is cut off by spacing the friction member apart from the separator plate.

In the friction member to be used in the conventional frictional engagement device, a part forming the cored bar is made of a metallic plate, and there is a problem of friction members becoming heavier. Therefore, reduction in weight has been desired. In order to reduce the weight of the friction member, there can be mentioned a technique in which an entire friction member including the cored bar is formed of baked carbon fiber. However, this technique has a problem in that impact resistance is lowered, even though the weight reduction of the friction member is attained.

A production of such a friction member generally requires baking carbon by a high-temperature baking in a high temperature range of 1000-2000° C.; impregnating a space formed by vaporization with a resin liquid; baking again; and repeating these steps. Therefore, such a friction member has a problem in that the production is time-consuming and expensive.

In addition, a recent frictional engagement device, such as a clutch for an automatic transmission, attains a high level of performance and becomes highly functional. In accordance with this development, improvement in a friction coefficient (frictional properties) of the friction member has been demanded.

DISCLOSURE OF THE INVENTION

The present inventors made intensive and extensive studies with a view toward reducing the weight of the friction member, and as a result, they found that a friction member suitable for the frictional engagement device, such as a clutch for an automatic transmission, can be obtained, by performing baking in such a manner that a part of a resin component remains (i.e. a matrix is not completely carbonized) to give a pore-containing friction member made of a carbon fiber/carbonaceous composite material, instead of complete baking as conventionally performed.

In one aspect of the present invention, there is provided a friction member for a frictional engagement device formed of a friction member made of a carbon fiber/carbonaceous composite material, the friction member made of a carbon fiber/carbonaceous composite material being obtained by implementing a heat treatment on a precursor, the precursor comprising a matrix composed of a carbon binder and an additive and carbon fiber dispersed in the matrix, wherein a porosity of the friction member is 20-60%.

Since the friction member made of a carbon fiber/carbonaceous composite material has the porosity of 20-60%, the friction coefficient can be improved. As a result, when the friction member is used, for example, in a frictional engagement device, such as a clutch for an automatic transmission, requisite properties are satisfied. Specifically, retentivity of lubricant on a frictional surface can be enhanced, and excellent frictional properties can be obtained. At the same time, durability of the friction member can be improved. It should be noted that, when the porosity is below 20%, a volume of pores is not satisfactory. As a result, the frictional surface is not rapidly lubricated with the oil, leading to poor frictional properties and poor cooling of a friction site. When the porosity is above 60%, fracture toughness of the friction member is likely to be affected and impact resistance is lowered, leading to decrease in durability at an early stage.

It is preferred that a part of the matrix in the precursor remain in the friction member made of a carbon fiber/carbonaceous composite material. In this case, the heat treatment of the precursor is performed in such a manner that a part of the matrix remains, i.e. the precursor is not completely baked (the matrix is not completely carbonized). As a result, as compared with the conventional friction member obtained by complete baking of the entire body, the friction member made of a carbon fiber/carbonaceous composite material is provided with fracture toughness and elasticity, and the friction member has a desired strength to withstand impact, which is suitable for employment in, for example, a frictional engagement device, such as a clutch for an automatic transmission.

Since there is no need to completely bake the carbon fiber, conventional troublesome operations performed for complete baking of the carbon fiber become unnecessary. For example, by performing a heat treatment once, a desired friction member made of a carbon fiber/carbonaceous composite material can be obtained. As a result, the friction member can be obtained in a shorter period of time at a lower cost as compared with the conventional friction member. Moreover, since a part of the matrix remaining in the friction member made of a carbon fiber/carbonaceous composite material plays a role as a binder, even when the porosity is set high, excellent fracture toughness of the friction member made of a carbon fiber/carbonaceous composite material is retained. As a result, the friction member made of a carbon fiber/carbonaceous composite material can be made thinner. Therefore, a friction member that contributes to reduction in size of the frictional engagement device can be obtained.

It is also preferred that the heat treatment be a low-temperature baking at 300-600° C. When the heat treatment of the precursor is performed by a low-temperature baking at 300-600° C., which has not been performed in the conventional baking technique, the matrix is not completely baked (the matrix is not completely carbonized) and remains in the friction member made of a carbon fiber/carbonaceous composite material. With this configuration, the resultant friction member made of a carbon fiber/carbonaceous composite material exhibits excellent effects as described above.

It is also preferred that, in the friction member for a frictional engagement device, a weight reduction rate of the friction member made of a carbon fiber/carbonaceous composite material after the heat treatment (for example, when heated to 600° C. in a non-oxidative atmosphere) relative to the precursor before the heat treatment be 20% or less.

As described above, by setting the weight reduction rate to not more than 20% when the weight of the friction member made of a carbon fiber/carbonaceous composite material after the heat treatment is compared with the precursor before the heat treatment, there can be obtained a friction member made of a carbon fiber/carbonaceous composite material having suitable porosity, strength and frictional properties for a friction member of the frictional engagement device, such as a clutch for an automatic transmission. It should be noted that, since the porosity varies in the above-mentioned range of 20-60% depending on the amount of the matrix, setting the weight reduction rate of the friction member made of a carbon fiber/carbonaceous composite material as such is effective upon obtaining a high-quality friction member having a desired strength.

Moreover, it is preferable that a bending strength of the friction member made of carbon fiber/carbonaceous composite material for a frictional engagement device be set to 60 MPa or more.

By setting the bending strength of the friction member made of a carbon fiber/carbonaceous composite material to 60 MPa or more, there can be obtained a friction member which exhibits excellent shock resistance and thus is suitable as a friction member of a frictional engagement device, such as a clutch for an automatic transmission.

In the friction member for a frictional engagement device, it is also desired that a friction member body and a friction layer be formed as a single piece by the heat treatment of the precursor.

Since the friction member body and the friction layer are integrally formed, weight is remarkably reduced as compared with the conventional friction member using a metallic cored bar. Therefore, for example, when the friction member is applied to a frictional engagement device, such as a clutch for an automatic transmission, inertia caused by rotation of the friction member can be reduced, and thus loss of driving force due to transmission can be lowered. As a result, when used in a frictional engagement device, such as a clutch for an automatic transmission of an automobile, fuel consumption can be economized.

In another aspect of the present invention, there is provided a method for producing a friction member for a frictional engagement device which includes: forming a precursor comprising a matrix composed of a carbon binder and an additive and carbon fiber dispersed in the matrix, and implementing a low-temperature baking on the precursor so that the matrix remains, to obtain a friction member made of a carbon fiber/carbonaceous composite material having a porosity of 20-60%.

According to the above-mentioned method, a friction member made of a carbon fiber/carbonaceous composite material can be obtained by implementing a low-temperature baking on a precursor comprising a matrix composed of a carbon binder and an additive and carbon fiber dispersed in the matrix in such a manner that a part of the matrix remains. Due to the low-temperature baking, a part of the matrix remains, in other words, the precursor is not completely baked. As a result, as compared with the conventional friction member obtained by complete baking of the entire body, the friction member made of a carbon fiber/carbonaceous composite material is provided with fracture toughness and elasticity, and the friction member has a desired strength to withstand impact, which is suitable for employment in, for example, a frictional engagement device, such as a clutch for an automatic transmission. Since there is no need to completely bake the carbon fiber, conventional troublesome operations performed for complete baking of the carbon fiber become unnecessary. For example, by performing a low-temperature baking once, a desired friction member made of a carbon fiber/carbonaceous composite material can be obtained. As a result, the friction member can be obtained in a shorter period of time at a lower cost as compared with the conventional friction member.

Since the porosity is set to 20-60%, the above-mentioned effect can be obtained. Accordingly, a presence of pores can improve a friction coefficient, and when the friction member is used, for example, in a frictional engagement device, such as a clutch for an automatic transmission, retentivity of lubricant on a frictional surface can be enhanced, and excellent frictional properties can be obtained, and durability of the friction member can be improved. Since a part of the matrix remaining in the friction member made of a carbon fiber/carbonaceous composite material plays a role as a binder, even when the porosity is set high, excellent fracture toughness of the friction member made of a carbon fiber/carbonaceous composite material is retained. As a result, the friction member made of a carbon fiber/carbonaceous composite material can be made thinner. Therefore, a friction member that contributes to reduction in size of the frictional engagement device can be obtained.

According to the friction member for the frictional engagement device and the method for producing the same of the present invention, weight can be reduced, and at the same time, the friction member for the frictional engagement device exhibiting excellent impact resistance and improved friction coefficient can be obtained.

The various aspects and effects described above and other effects and further features of the present invention will become more apparent by describing in detail illustrative, non-limiting embodiments thereof with reference to the accompanying drawings.

BRIEF DESCRIPTION OF THE DRAWINGS

FIG. 2 shows a friction member for a frictional engagement device according to one embodiment of the present invention.

FIG. 3 shows a separator plate.

DESCRIPTION OF THE PREFERRED EMBODIMENT

The embodiment of the friction member for a frictional engagement device according to the present invention will be described below with reference to the drawings.

Figure 1:
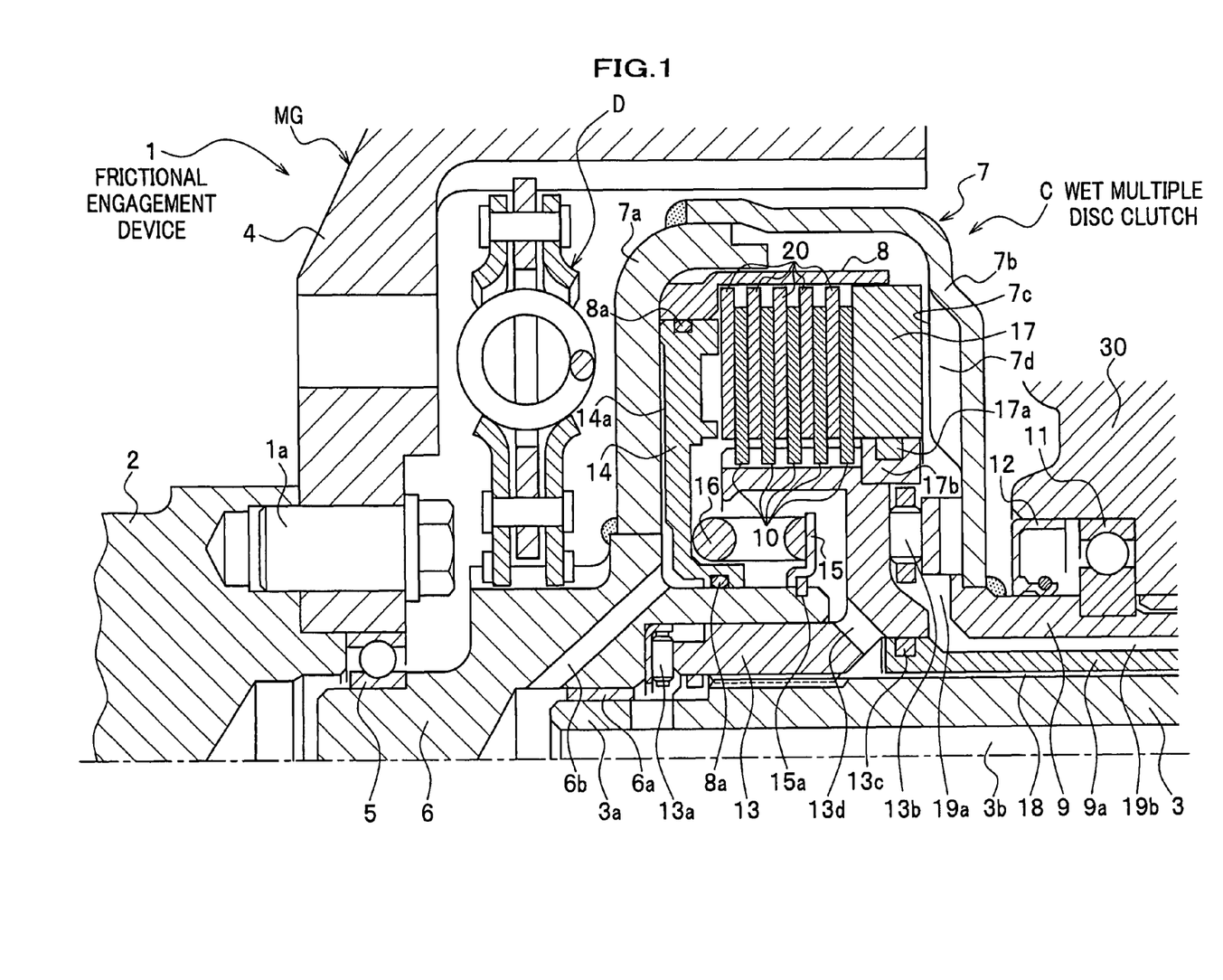
FIG. 1 is a cross section of a main part of a frictional engagement device to which a friction member for a frictional engagement device according to one embodiment of the present invention is employed.

A friction member for a frictional engagement device (hereinafter simply and frequently referred to as "friction member") of the present embodiment is, for example, as shown in FIG. 1, employed to a wet multiple disc clutch C in a frictional engagement device 1, such as a clutch for an automatic transmission of an automobile. A friction member 10 is made of a carbon fiber/carbonaceous composite material (C/C composite material) that can be obtained by implementing a low-temperature baking on a precursor comprising a matrix composed of a carbon binder and an additive and carbon fiber dispersed in the matrix. In the friction member 10, a friction member body (corresponding to the cored bar) and a friction layer (slidably contacts with a separator plate 20 which will be described below) are integrally formed with a use of the precursor.

The frictional engagement device 1 of the present embodiment can be employed to a hybrid car having an engine (not shown) and a motor generator MG, and formed of the motor generator MG, a damper D and the wet multiple disc clutch C that are disposed in series between a crank shaft 2 from the engine (not shown) and a main shaft 3 from a transmission (not shown).

In the motor generator MG, a rotor 4 is fixed to the crank shaft 2 through a bolt 1a, and on the rotor 4, a clutch input axis 6 of the wet multiple disc clutch C is supported through a ball bearing 5. To the clutch input axis 6, one end of a clutch case 7 is fixed by welding. The clutch case 7 is formed of a first case 7a and a second case 7b, a part of which overlaps with and is welded to an outer periphery of the first case 7a. To an inner surface of the first case 7a of the clutch case 7, a clutch guide 8 is fixed. On the other hand, the second case 7b is welded to an oil pump hub 9 configured to drive an oil pump (not shown). The oil pump hub 9 is supported on a transmission case 30 through a ball bearing 11, and between the oil pump hub 9 and the transmission case 30, an oil seal 12 is disposed.

The main shaft 3 of the transmission has a small-diameter end part 3a that is supported by a supporting hole of the clutch input axis 6 through a bearing metal 6a. An outer periphery of the main shaft 3 is spline-wise connected to a clutch hub 13, with one end of the clutch hub 13 opposing to an end face of the clutch input axis 6 through a thrust bearing 13a and the other end opposing to an inner face of the second case 7b through a thrust bearing 13b. Between an outer periphery of the main shaft 3 and an inner periphery of the oil pump hub 9, a cylindrical oil separator 9a is disposed. Between an outer periphery of an end part of the oil separator 9a and an inner periphery of an end part of the clutch hub 13, a seal ring 13c is disposed.

Figures 2A, 2B:
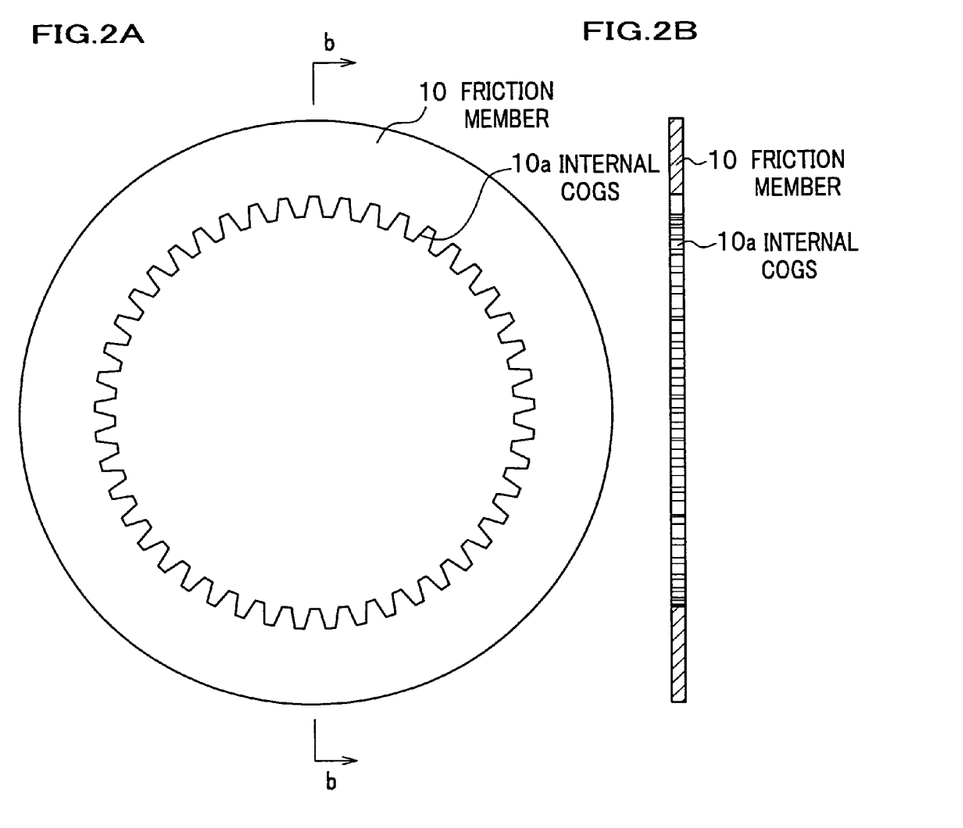
FIG. 2A is a front view.
FIG. 2B is a cross section along a line b-b of FIG. 2A.
Figures 3A, 3B:
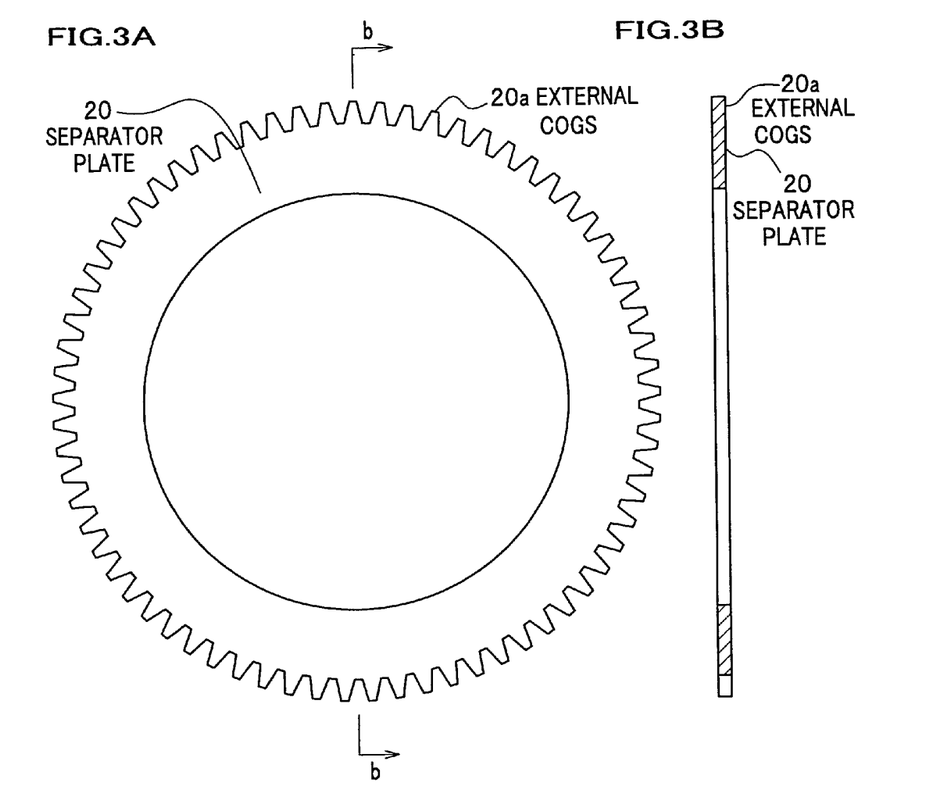
FIG. 3A is a front view.
FIG. 3B is a cross section along a line b-b of FIG. 3A.

In the wet multiple disc clutch C, five friction members 10 and five separator plates 20 as coupling member are alternately laminated. The friction member 10 is disposed in such a manner that an outer periphery of the clutch hub 13 is spline-wise engaged with internal cogs 10a (see FIG. 2A and FIG. 2B). The separator plate 20 is disposed in such a manner that an inner periphery of the clutch guide 8 is spline-wise engaged with external cogs 20a (see FIG. 3A and FIG. 3B). As shown in FIG. 1, an end plate 17 is lateral to the friction member 10 placed at the outermost position. Through a seal ring 17a, the end plate 17 abuts an annular partition member 17b provided on the outer periphery of the clutch hub 13. On an inner surface of the second case 7b that is lateral to the end plate 17, a plurality of flat pressure receiving surfaces 7c that can adhere to the end plate 17 are formed. Between the pressure receiving surfaces 7c (only one is shown in FIG. 1), oil grooves 7d are radially formed.

Between the clutch guide 8 and the clutch input axis 6, a clutch piston 14 is slidably fit in through a pair of inner and outer O rings 8a, 8a. Between the clutch piston 14 and the first case 7a, a clutch oil space 14a is defined. The clutch oil space 14a communicates with an oil passage 3b formed in the main shaft 3 via an oil passage 6b penetrating through the clutch input axis 6 in a radial direction. The outermost separator plate 20 faces the clutch piston 14 in such a manner that they can be brought into contact to each other.

In the wet multiple disc clutch C, a spring sheet 15 is supported on the clutch input axis 6 by a clip 15a. Between the spring sheet 15 and the clutch piston 14, a clutch spring 16 is inserted in a compressed state. With this configuration, the clutch piston 14 is biased in a direction away from the outermost separator plate 20 (in a direction that releases an engagement).

A space in which the friction members 10, the separator plates 20 and the end plate 17 slide over one another ("sliding space") communicates with an oil passage 18 formed between the main shaft 3 and the oil separator 9a via a plurality of through-holes 13d (only one is shown in FIG. 1) that penetrates through the clutch hub 13. The sliding space communicates also with an oil passage 19b formed between an inner periphery of the oil pump hub 9 and an outer periphery of the oil separator 9a, through the oil grooves 7d (only one is shown in the drawing) of the second case 7b and the oil passage 19a formed between the clutch hub 13 and the oil pump hub 9. Accordingly, the sliding space is provided with oil through these passages.

The friction member 10 of the present embodiment was formed in such a manner that the porosity of the friction member made of a carbon fiber/carbonaceous composite material became 20-60%, by implementing a low-temperature baking of a 300-600° C. heat treatment on the precursor so that a part of the matrix remains, as described above. In addition, as will be described below, the friction member 10 was formed in such a manner that the weight reduction rate of the precursor did not exceed 20% when elevated to 600° C. in a non-oxidative atmosphere, and that the bending strength R became 60 MPa or more.

As for carbon fiber (CF) to be used as a material for the friction member 10, any material can be used, such as pitch, PAN (polyacrylonitrile) and rayon. As for the carbon fiber, uncarbonized carbonaceous fiber can be also used. There are no limitations with respect to length and diameter of carbon fiber, and any carbon fiber can be used. Examples of the carbon binders include thermosetting resin, such as phenol resin, furan resin, polyimide resin and epoxy resin; pitch, such as oil and coal; and a composition obtained by formulating the resin with the pitch. Among these, phenol resin is preferred since it can attain higher binding strength. Such a carbon binder may act also as a binder for enhancing fracture toughness of a precursor (or a friction member made of a carbon fiber/carbonaceous composite material). Examples of the additives include oil- and/or coal-coke powder, appropriate ceramic powder, and fibrous or organic binder.

The friction member 10 to be used for the frictional engagement device 1 was produced in the following steps:

(1) The carbon fiber, the carbon binder and the additive were agitated to obtain a mixture, and a torus-shaped die was filled with the mixture. Hot-pressing was conducted at die temperature of 250° C. under 10 MPa, to thereby obtain a precursor. With respect to an amount ratio of the carbon fiber (CF) and the matrix, there is no limitation and various embodiments are possible as shown in Examples 1-14 in Table 1.

(2) Next, the obtained precursor was placed in a heating furnace, and subjected to a low-temperature baking (heat treatment) in a nitrogen gas atmosphere at a baking temperature of 300-600° C. for 2 hours, to thereby obtain a friction member made of a carbon fiber/carbonaceous composite material. Data of the friction member made of a carbon fiber/carbonaceous composite material were shown in Table 1 while categorized based on baking temperatures of 300° C., 400° C., 500° C. and 600° C.

(3) On an outer periphery of the resultant friction member made of a carbon fiber/carbonaceous composite material, internal cogs 10a (see FIG. 2A and FIG. 2B)) were formed with a press puncher, and then a frictional surface (a sliding surface relative to the separator plate 20) was ground as finish processing. As a result, the friction member 10 having a thickness of 1.8 mm was obtained.

TABLE 1

| Baking temperature | EX | Material composition (%) CF A | Material composition (%) Matrix B | Volatilization ratio of matrix (%) C | Porosity (%) D (=B*C) | Bending Strength (MPa) E | $\mu 0/\mu d$ F |
|---|---|---|---|---|---|---|---|
| 300 | 1 | 28 | 72 | 28 | 20.2 | 194.0 | 1.037 |
| | 2 | 22 | 78 | 51 | 39.8 | 119.6 | 0.990 |
| | 3 | 17 | 83 | 60 | 49.8 | 96.2 | 0.967 |
| 400 | 4 | 30 | 70 | 28 | 19.6 | 134.3 | 1.032 |
| | 5 | 26 | 74 | 41 | 30.3 | 126.7 | 1.005 |
| | 6 | 18 | 82 | 61 | 50.0 | 75.2 | 0.968 |
| 500 | 7 | 32 | 68 | 29 | 19.7 | 110.7 | 1.040 |
| | 8 | 28 | 72 | 42 | 30.2 | 94.1 | 1.010 |
| | 9 | 24 | 76 | 53 | 40.3 | 79.3 | 0.984 |
| 600 | 10 | 35 | 65 | 30 | 19.5 | 94.7 | 1.035 |
| | 11 | 30 | 70 | 44 | 30.8 | 74.2 | 1.004 |
| | 12 | 25 | 75 | 52 | 39.0 | 67.6 | 0.985 |
| | 13 | 20 | 80 | 61 | 48.8 | 51.9 | 0.970 |
| | 14 | 15 | 85 | 73 | 62.1 | 31.5 | 0.965 |

Figure 4:
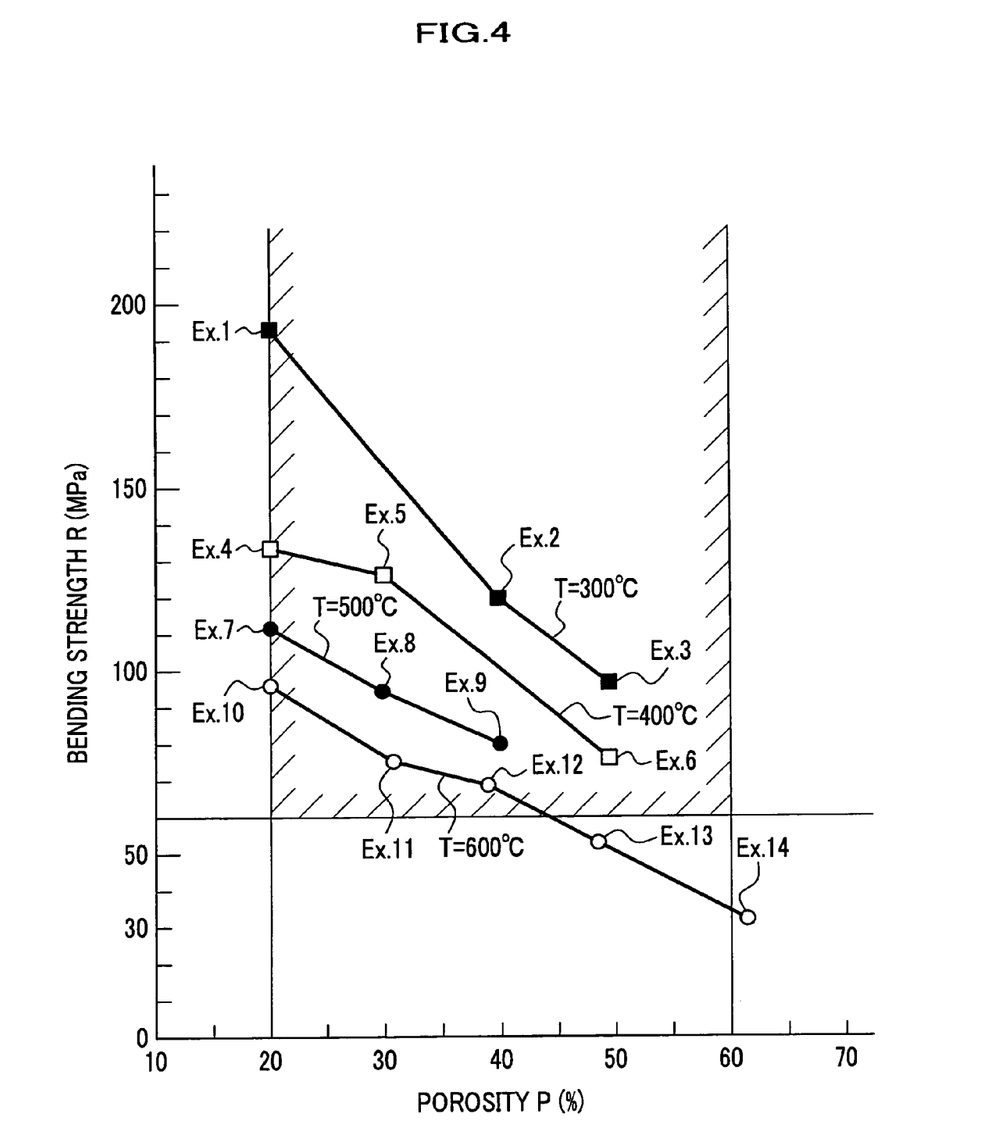
FIG. 4 is a graph showing a relationship between porosity and bending strength.

Based on the data of the friction member made of a carbon fiber/carbonaceous composite material shown in Table 1, a relationship between the porosity P (%) and the bending strength R (MPa) friction member made of a carbon fiber/carbonaceous composite material was determined and represented as a graph shown in FIG. 4. As is apparent from FIG. 4, the bending strength R (MPa) relatively decreases as the baking temperature rises. The reason is as follows: though a part of the matrix remains in the friction member made of a carbon fiber/carbonaceous composite material due to low-temperature baking, an amount of the volatilized matrix also increases as the baking temperature rises. When the porosity P (%) becomes larger, the friction member made of a carbon fiber/carbonaceous composite material has more space by the increment of the porosity, and the bending strength R (MPa) is lowered. From a viewpoint of providing the excellent bending strength R (MPa) to the friction member 10 to be used in the frictional engagement device 1 (see FIG. 1), for example, when a high impact on the frictional engagement device 1 is taken into consideration, it is desired that excellent frictional properties (which is susceptible to the porosity P (%)) be retained. Accordingly, it is considered that the bending strength R (MPa) should be 60 MPa or more based on the findings so far, including durability requirements for the internal cogs 10a in the friction member 10 and the like.

Figure 5:
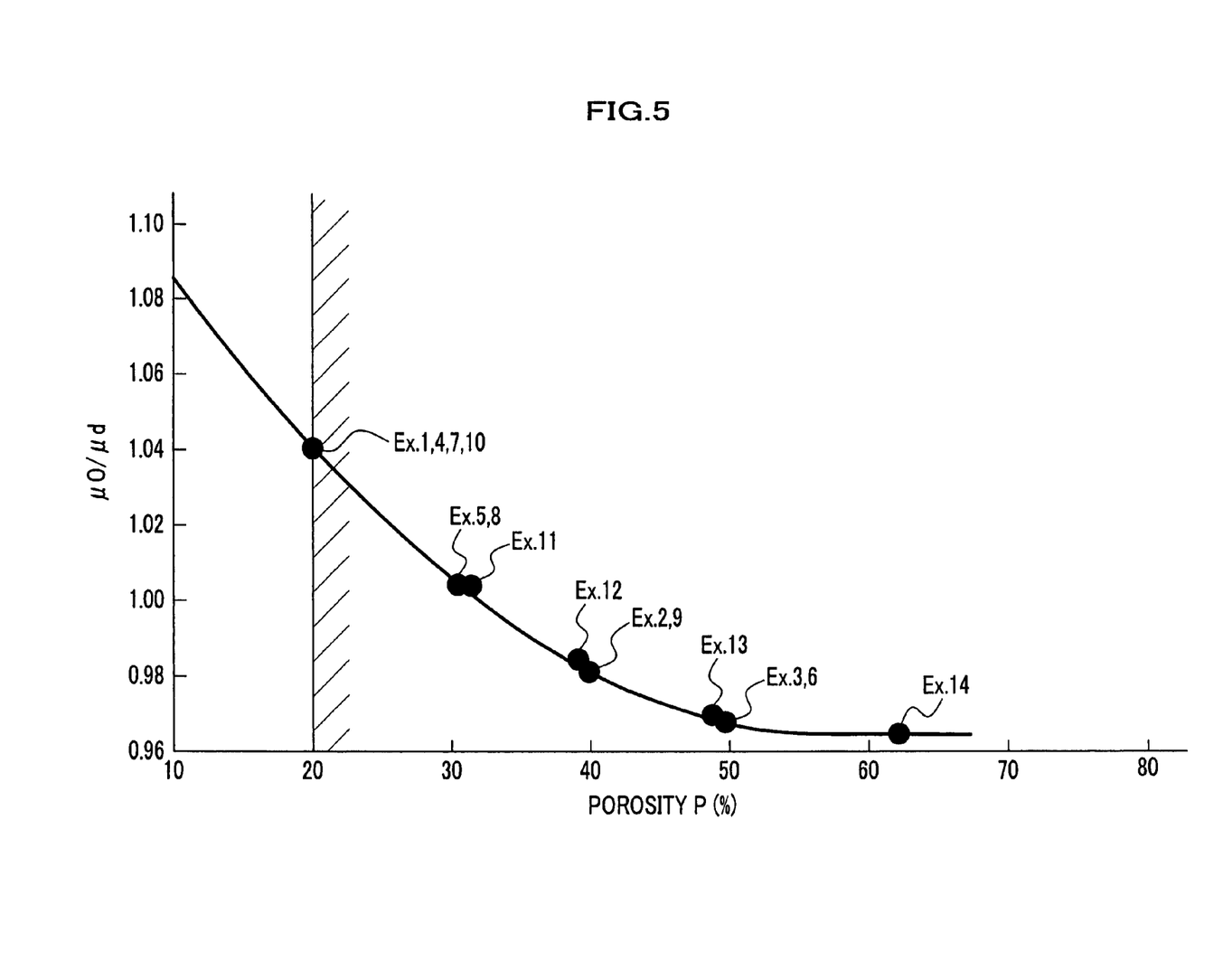
FIG. 5 is a graph showing a relationship between porosity P (%) and μ0/μd of a friction member made of a carbon fiber/carbonaceous composite material.
Figure 6:
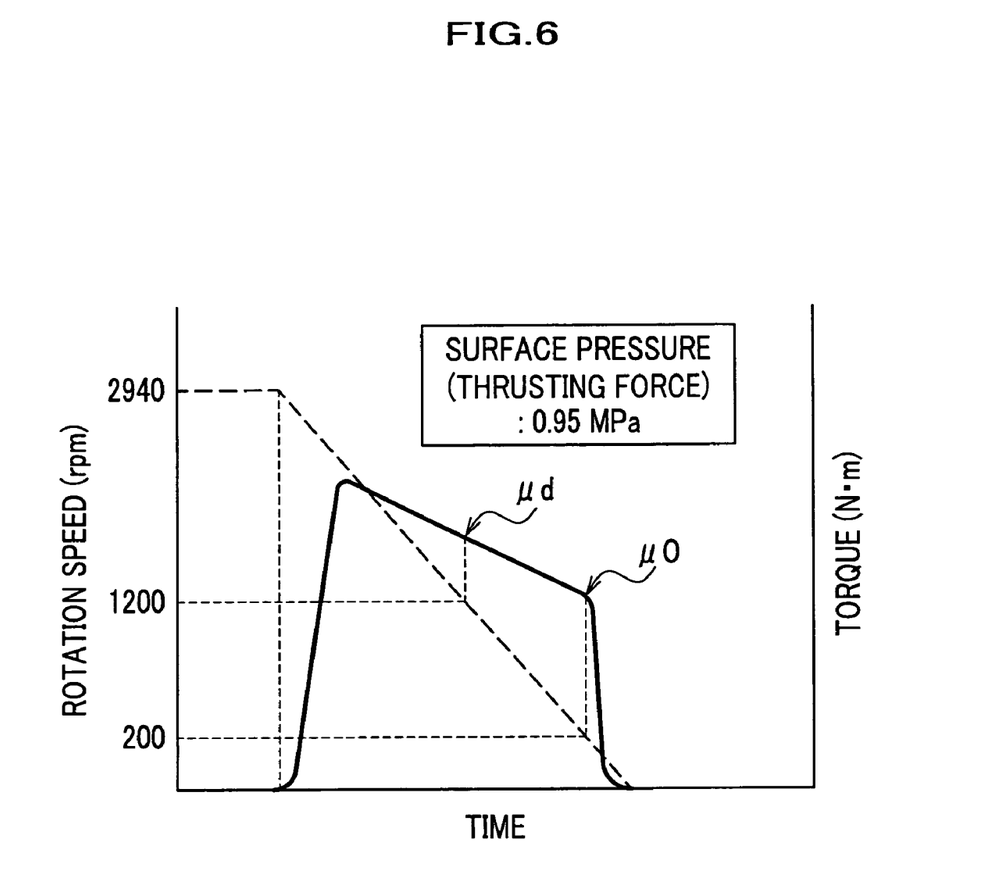
FIG. 6 is a torque waveform chart in a case of an SAE No. 2 test machine.

FIG. 5 is a graph showing a relationship between the porosity P (%) and the friction coefficient $\mu 0/\mu d$ of the friction member made of a carbon fiber/carbonaceous composite material, based on the friction members made of a carbon fiber/carbonaceous composite material (Examples 1-14) in Table 1, and FIG. 6 is a torque waveform chart in a case of an SAE No. 2 test machine, to be used for evaluating frictional properties.

For each of the friction members made of a carbon fiber/carbonaceous composite material (friction member 10, see Table 1) of Examples 1-14, a friction evaluation test was conducted in the following manner. The friction member 10 made of a carbon fiber/carbonaceous composite material was sandwiched between two separator plates 20, 20, and installed in a SAE No. 2 test machine. Friction evaluation test was conducted under the following conditions: surface pressure of 0.95 MPa; rotational speed of 2940 rpm; inertia of 0.12 kg·m$^2$; test oil temperature of 100° C.; and number of test cycle of 500. As a result, friction coefficients $\mu 0$ and $\mu d$ were determined. These $\mu 0$ and $\mu d$ are shown in a torque waveform chart of FIG. 6 in a case of the SAE No. 2 test machine, where $\mu d$ is a friction coefficient when the friction member 10 rotates at 1200 rpm, and $\mu 0$ is a friction coefficient when the friction member 10 rotates at 200 rpm immediately before drastic decrease in torque. The value "$\mu$" is obtained by dividing a torque by a surface pressure when a clutch engages. These friction coefficients were obtained based on a braking test in which a rotating mass is stopped. It should be noted that Kanigen plating was applied to the separator plates 20.

As shown in FIG. 5, when the porosity P (%) increases (oil lubricity increases), $\mu 0/\mu d$ as an index of frictional properties becomes small, and thus the friction member is excellent in preventing judder. As described above, when a high impact on the frictional engagement device 1 is taken into consideration, it is desired that $\mu 0/\mu d$ be set to 1.04 or less as a condition, and from such a viewpoint, it is preferred that the porosity P (%) be set to 20-60%. The reason for setting the upper limit to 60% is that, when the porosity P (%) is above 60%, $\mu 0/\mu d$ barely changes and formation of the friction member 10 becomes difficult under this condition, and further, as shown in FIG. 4, a satisfactory bending strength R (MPa) cannot be attained.

The pores in the friction member 10 are formed mainly by removal of volatile components in the precursor during a low-temperature baking, and the porosity P (%) can be measured by a method in which size of pores formed on the surface is observed by microscope, or other conventional methods.

Figure 7:
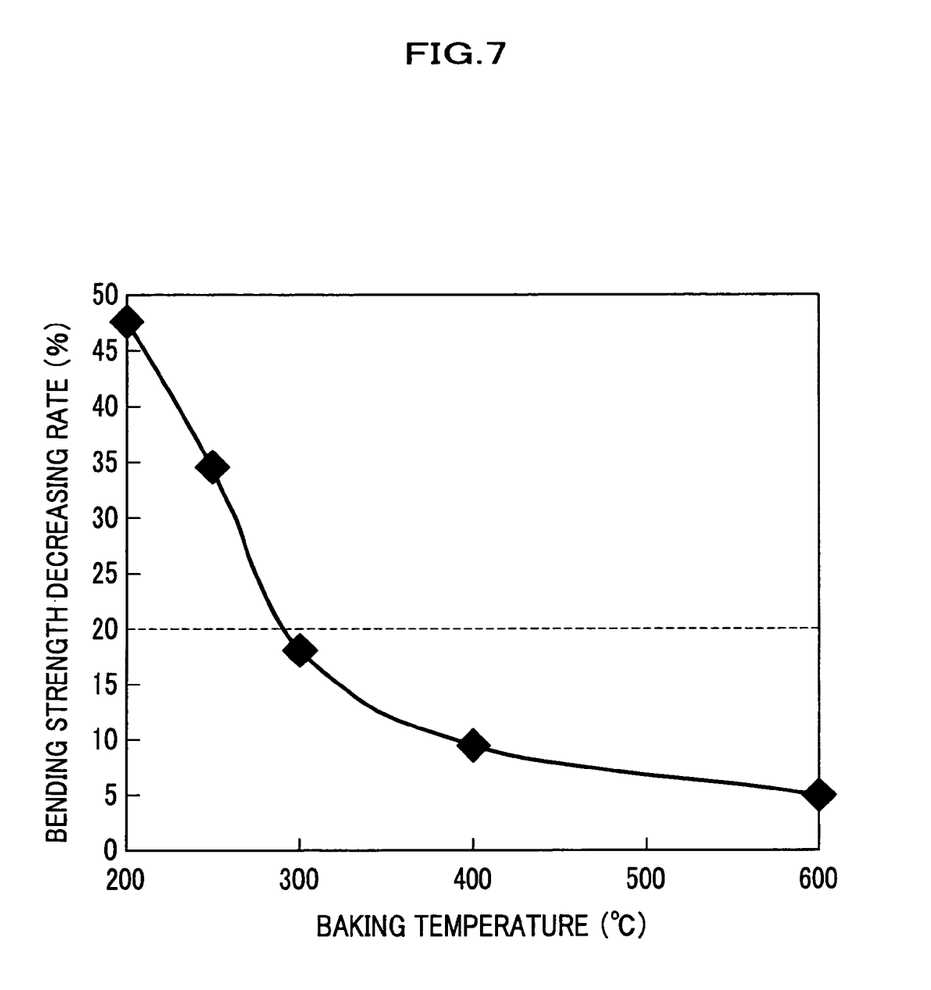
FIG. 7 is a graph showing a relationship between baking temperature and bending strength decreasing rate after exposed to a 300° C.-atmosphere for 1 hour.

Referring to FIG. 7, a bending strength decreasing rate relative to a baking temperature after the friction member was exposed to use environment will be explained. As shown in FIG. 7, when the baking temperature is below 300° C., the bending strength decreasing rate is remarkably enhanced. This is because decrease in the baking temperature to, for example, 200° C. leads to excessive residual volume of the matrix in the friction member made of a carbon fiber/carbonaceous composite material, and the resultant friction member 10 is susceptible to thermal deterioration. On the other hand, it was found that retaining the baking temperature in the range of 300-600° C. suppresses the bending strength decreasing rate (%) to 20% or less, and therefore the friction member 10 that can be used without causing any problems in durability can be obtained.

Figure 8:
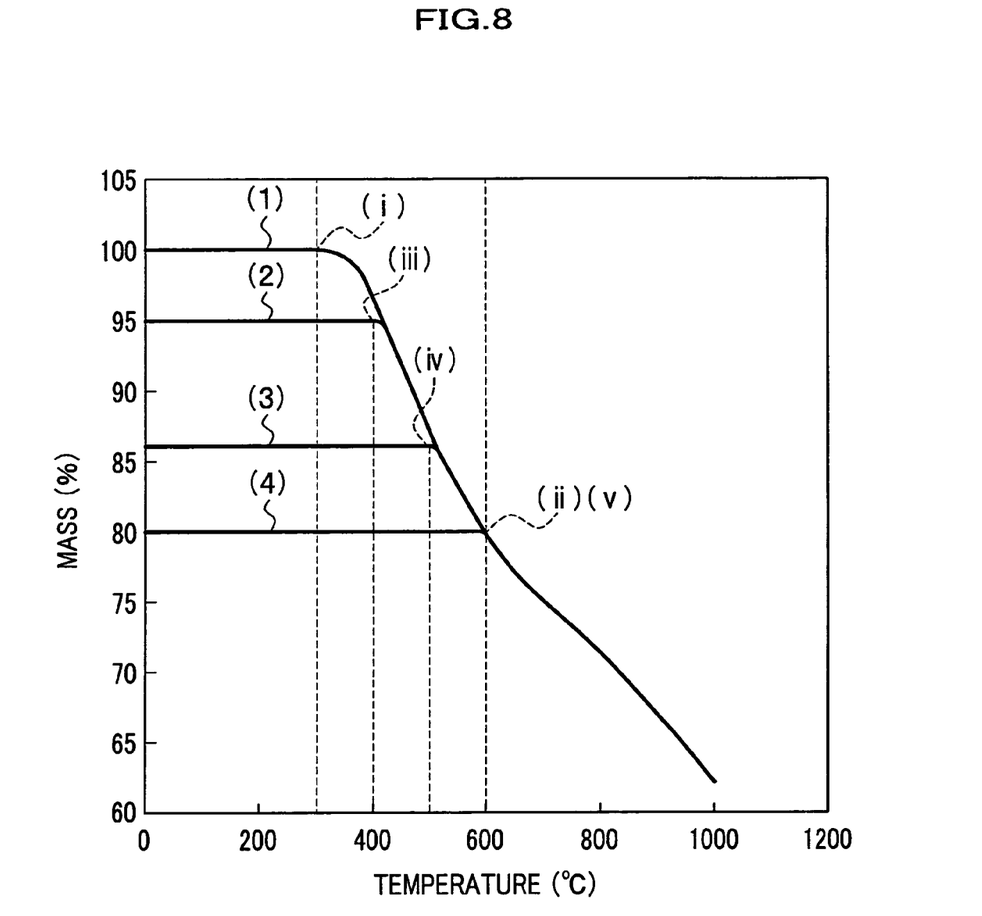
FIG. 8 is a graph showing weight reduction rate of a friction member made of a carbon fiber/carbonaceous composite material.

Referring to FIG. 8, a weight reduction rate of the friction member made of a carbon fiber/carbonaceous composite material relative to a baking temperature will be explained. FIG. 8 is a graph showing a weight reduction rate obtained when the friction members made of a carbon fiber/carbonaceous composite materials were baked at a baking temperature of 300° C., 400° C., 500° C. or 600° C. and left under a non-oxidizing atmosphere (under a nitrogen atmosphere) at temperature up to 600° C. for 1 hour. In the drawing, a line (1) indicates change in weight of the friction member made of a carbon fiber/carbonaceous composite material at an atmospheric temperature of 300° C.; in the drawing, lines (2), (3) and (4) indicate changes in weight of the friction member made at atmospheric temperatures of 400° C., 500° C. and 600° C., respectively. As is apparent from the drawing, for the friction member made at any atmospheric temperatures of 400° C., 500° C. or 600° C., as the temperature approaches high-temperature range, the line overlaps with the line (1) of the friction member of atmospheric temperature of 300° C.

First, a low-temperature range of 300° C. or lower is explained in reference with the line (1) in the drawing. Suppose a weight of the friction member made of a carbon fiber/carbonaceous composite material baked at 300° C. is 100, it was observed that weight reduction barely occurs in a low-temperature range below 300° C. This indicates that carbonization of the matrix is not in progress.

Next, weight change in the 300° C.-baking product will be explained. As shown in the line (1) in FIG. 8, when focusing on the weight reduction in the range of 300-600° C., the weight was approximately 100% at 300° C. (at a position indicated with (i)), while the weight became approximately 80.0% at 600° C. (at a position indicated with (ii)). Therefore, the weight reduction rate in this temperature range was approximately 20%.

As shown with the line (2) in FIG. 8, when focusing on the weight reduction of the 400° C.-baking product in the range of 400-600° C., the weight was approximately 94.9% at 400° C. (at a position indicated with (iii)), while the weight was 80.0% at 600° C. (at the position indicated with (ii)), as described above. Therefore, the weight reduction rate in this temperature range was approximately 15.7%.

Further, as shown with the line (3) in FIG. 8, when focusing on the weight reduction of the 500° C.-baking product in the range of 500-600° C., the weight was approximately 86.1% at 500° C. (at a position indicated with (iv)), while the weight was 80.0% at 600° C. (at the position indicated with (ii)), as described above. Therefore, the weight reduction rate in this temperature range was approximately 7.1%.

It should be noted that, with respect to the 600° C.-baking product, from a position where the weight was 80.0% (a position indicated with (v), which is the same as the position indicated with (ii)), as the temperature approaches a higher temperature range, the line traces the line (1) of the 300° C.-baking product.

As shown above, all of the weight reduction rates in the range of 300-600° C. of the baking products obtained at baking temperatures of 300° C., 400° C., 500° C. and 600° C. became approximately 20% or less (did not exceed 20%). Therefore, by conducting a low-temperature baking in this temperature range (300-600° C.), the friction member 10 made of a carbon fiber/carbonaceous composite material that exhibits suitable porosity, strength and frictional properties can be obtained. It should be noted that, since the porosity P (%) varies in the above-mentioned range of 20-60% depending on the amount of the matrix, setting the weight reduction rate of the friction member made of a carbon fiber/carbonaceous composite material as such is effective upon obtaining a high-quality friction member 10 having a desired strength.

As described above, the friction member 10 of the present embodiment can be obtained by implementing a low-temperature baking on the precursor comprising the matrix composed of the carbon binder and the additive and the carbon fiber dispersed in the matrix.

Since the heat treatment of the precursor is performed by a low-temperature baking at 300-600° C., which has not been performed in the conventional baking technique, the matrix is not completely baked and not completely carbonized, and remains in the friction member made of a carbon fiber/carbonaceous composite material. As a result, as compared with the conventional friction member obtained by complete baking of the entire body, the friction member made of a carbon fiber/carbonaceous composite material is provided with fracture toughness and elasticity, and the friction member has a desired strength to withstand impact, which is suitable for employment in, for example, a frictional engagement device, such as a clutch for an automatic transmission.

Since there is no need to completely bake the carbon fiber, conventional troublesome operations performed for complete baking of the carbon fiber become unnecessary. By performing a heat treatment once, a desired friction member made of a carbon fiber/carbonaceous composite material can be obtained. As a result, the friction member can be obtained in a shorter period of time at a lower cost as compared with the conventional friction member 10.

In addition, since the porosity is set to 20-60%, a presence of pores can improve frictional resistance, and therefore, required properties are satisfied when employed as the friction member 10 of the frictional engagement device 1. When the porosity is below 20%, a volume of pores is not satisfactory. As a result, the frictional surface is not rapidly lubricated with the oil retained in pores, leading to poor frictional properties and poor cooling of a friction site. When the porosity is above 60%, fracture toughness of the friction member 10 is likely to be affected and when used as a friction member of a frictional engagement device, such as a clutch for an automatic transmission, a desired strength cannot be obtained, leading to decrease in durability at an early stage. On the other hand, in the present embodiment, the porosity is set to 20-60%, and therefore, retentivity of lubricant on a frictional surface is enhanced, and excellent frictional properties can be obtained. At the same time, durability thereof can be improved.

When the porosity of the friction member made of a carbon fiber/carbonaceous composite material becomes larger, the friction member made of a carbon fiber/carbonaceous composite material has more space by the increment of the porosity. However, since a part of the matrix remains in the friction member made of a carbon fiber/carbonaceous composite material as described above and plays a role as a binder, excellent fracture toughness of the friction member made of a carbon fiber/carbonaceous composite material is retained. In other words, by incompletely baking the matrix, a strength of the entire friction member 10 including the internal cogs 10a (see FIG. 2A and FIG. 2B) formed therein is secured. Therefore, for example, even when the porosity is set to a value as high as 60%, there is no need to make the friction member 10 thicker for the purpose of securing the strength, and the friction member 10 can be made thinner. Therefore, the friction member 10 that contributes to reduction in size of the frictional engagement device 1 can be obtained.

In addition, since the bending strength R of the friction member made of a carbon fiber/carbonaceous composite material is set to 60 MPa or more, there can be obtained the friction member 10 which exhibits excellent shock resistance and thus is suitable for the frictional engagement device 1.

In the friction member 10, since the friction member body and the friction layer are integrally formed with a use of the precursor, weight is remarkably reduced as compared with the conventional friction member using a cored bar. Therefore, inertia caused by rotation of the friction member 10 can be reduced, and thus loss of driving force due to transmission can be lowered. As a result, when used in a frictional engagement device, such as a clutch for an automatic transmission of an automobile, fuel consumption can be economized.

In the embodiments above, the friction member 10 in which the friction member body and the friction layer are integrally formed with the use of the precursor was described. However, the present invention is not limited to this friction member, and for example, the description is applied to a friction member adhered to a cored bar.

The embodiments exemplifying the present invention have been described. However, it is a matter of course that the above embodiments may be properly modified without departing from the scope of the present invention as set forth in the attached claims.

INDUSTRIAL APPLICABILITY

The friction member and the method for producing the same according to the present invention can be suitably applied to any kind of frictional engagement device, particularly to a clutch for an automatic transmission of an automobile and the like.

The invention claimed is:

1. A friction member for a frictional engagement device formed of a friction member made of a carbon fiber/carbonaceous composite material,
    the friction member made of a carbon fiber/carbonaceous composite material being obtained by implementing a heat treatment on a precursor,
    the precursor comprising
        a matrix composed of a carbon binder and an additive and
        a carbon fiber dispersed in the matrix,
    wherein
        a porosity of the friction member is 20-60%,
        the friction member is formed as a single piece,
        a bending strength of the friction member is 60 MPa or more, and
        a weight reduction rate of the friction member after the heat treatment relative to the precursor before the heat treatment is 20% or less.

2. The friction member for a frictional engagement device according to claim 1, wherein a part of the matrix in the precursor remains in the friction member made of a carbon fiber/carbonaceous composite material.

3. The friction member for a frictional engagement device according to claim 1, wherein the heat treatment is a low-temperature baking at 300-600° C.

4. The friction member for a frictional engagement device according to any one of claims 1 to 3, wherein a friction member body and a friction layer are formed as a single piece by the heat treatment of the precursor.

5. A method for producing a friction member for a frictional engagement device, which includes:
    forming a precursor comprising
        a matrix composed of a carbon binder and an additive and
        carbon fiber dispersed in the matrix, and
    implementing a low-temperature baking on the precursor so that a part of the matrix remains, to obtain a friction member made of a carbon fiber/carbonaceous composite material having a porosity of 20-60%, wherein the low-temperature baking is performed so that a weight reduction rate of the friction member relative to a weight of the precursor becomes 20% or less.

6. The method for producing a friction member according to claim 5, wherein the low-temperature baking is conducted at 300-600° C.

* * * * *